(12) United States Patent
Berkemeier

(10) Patent No.: US 11,649,035 B2
(45) Date of Patent: May 16, 2023

(54) DIFFERENTIAL DRIVE PROPULSION SYSTEM AND COORDINATED CONTROL OF A GROUPING OF SUCH SYSTEMS FOR VEHICLE MANEUVERS

(71) Applicant: Matthew Donald Berkemeier, Beverly Hills, MI (US)

(72) Inventor: Matthew Donald Berkemeier, Beverly Hills, MI (US)

(73) Assignee: Matthew D. Berkemeier, Beverly Hills, MI (US)

(*) Notice: Subject to any disclaimer, the term of this patent is extended or adjusted under 35 U.S.C. 154(b) by 633 days.

(21) Appl. No.: 16/537,412

(22) Filed: Aug. 9, 2019

(65) Prior Publication Data

US 2020/0094943 A1    Mar. 26, 2020

Related U.S. Application Data

(60) Provisional application No. 62/751,704, filed on Oct. 28, 2018, provisional application No. 62/717,797, filed on Aug. 11, 2018.

(51) Int. Cl.
*B64C 11/00* (2006.01)
*B64D 27/24* (2006.01)
*F04D 25/16* (2006.01)

(52) U.S. Cl.
CPC ............ *B64C 11/001* (2013.01); *B64D 27/24* (2013.01); *F04D 25/16* (2013.01)

(58) Field of Classification Search
CPC ........ B64D 25/16; B64D 27/16; B64D 27/24; B64C 11/001; B64C 15/02; B64C 15/14
See application file for complete search history.

(56) References Cited

U.S. PATENT DOCUMENTS

| | | | | |
|---|---|---|---|---|
| 11,208,207 | B2* | 12/2021 | Lloyd | B64C 11/001 |
| 2007/0080257 | A1* | 4/2007 | Muylaert | B64C 15/02 |
| | | | | 244/12.3 |
| 2016/0009404 | A1* | 1/2016 | Newman | B64C 11/001 |
| | | | | 701/3 |
| 2018/0305036 | A1* | 10/2018 | Vondrell | H02K 9/19 |
| 2019/0127062 | A1* | 5/2019 | Witmer | B64C 15/02 |

* cited by examiner

*Primary Examiner* — Audrey B. Walter
*Assistant Examiner* — Dapinder Singh

(57) ABSTRACT

Multiple propulsion units mounted inside an enclosure near openings can be used to control the fluid flow in and out of the openings and also to determine the total fluid flow at any additional uncontrolled openings. By controlling the fluid flow, where such control is available, and by considering the resulting flow at any uncontrolled enclosure openings, it may be possible to achieve a desired thrust vector but have a more favorable weight/shape/efficiency than would be possible without the enclosure and use of coordinated control of fluid flow into or out of some openings. The designed geometry of the enclosure is an important consideration and will have an effect on the overall thrust magnitude and direction. A grouping of propulsion systems can be coordinated to achieve a more general thrust vector and associated moment on a vehicle.

20 Claims, 12 Drawing Sheets

$t_1$ $t_2$ $t_3$

DIFFERENTIAL DRIVE PROPULSION SYSTEM AND COORDINATED CONTROL OF A GROUPING OF SUCH SYSTEMS FOR VEHICLE MANEUVERS

CROSS REFERENCE TO RELATED APPLICATIONS

This U.S. patent application claims priority under 35 U.S.C. § 119(e) to U.S. Provisional Application 62/717,797, filed on Aug. 11, 2018 and U.S. Provisional Application 62/751,704, filed on Oct. 28, 2018. The disclosures of these prior applications are considered part of the disclosure of this application and are hereby incorporated by reference in their entireties.

TECHNICAL FIELD

This disclosure relates to transportation, specifically, the propulsion of a vehicle through a fluid medium, the primary fluid examples being air and water. This disclosure could be applied to both unmanned and manned vehicles.

BACKGROUND

A propulsion unit is some standard mechanism for generating fluid thrust along a single axis. The term propulsion system will be used to describe a more capable and complete propulsion mechanism, which can manage some significant portion of the motion of a vehicle. A propulsion system might involve multiple propulsion units, or it could involve one or more propulsion units together with moveable control surfaces for deflecting fluid flow. Other examples are also possible.

Most air vehicles use one or more basic propulsion units. A propulsion unit on an air vehicle may consist of an unshrouded propeller mounted to the rotating shaft of an internal combustion engine or an electric motor. Another class of propulsion unit is a gas turbine plus compressor with or without additional components, such as a shrouded or unshrouded propeller. Names for propulsion units in this other class include turboprop, turbofan, etc. Alternatively, a rocket engine or ramjet engine is also a propulsion unit, but there is no use of a compressor. All of these propulsion units force air to move in some single direction to create a reaction thrust, according to Newton's Third Law. Often, for air vehicles, the thrust direction is fixed, but control surfaces alter the fluid flow and change the direction of vehicle motion. Note that on an airplane, a propulsion system typically comprises one or more propulsion units plus movable control surfaces on the wings, vertical stabilizer, horizontal stabilizers etc.

A ducted fan consists of a propeller inside a shroud and some means for rotating the propeller. The duct increases efficiency and provides other benefits.

A propulsion unit for an underwater or surface vehicle will typically include a propeller or impeller and an electric motor or internal combustion engine. Again, the purpose is to force water in some single direction and create thrust. Sometimes propulsion units for underwater vehicles are termed thrusters. Sometimes water surface vehicles have a means to change the direction of the thrust. Alternatively, the thrust direction may be fixed, but control surfaces (e.g., rudder) deflect the fluid and change the direction of vehicle motion.

A VTOL (Vertical Takeoff and Landing) airplane requires vertical and horizontal thrust. Often this is achieved by pivoting a propulsion unit so that it points in the desired direction. Alternatively, the propulsion unit's direction can be fixed, but the airflow can be pointed in a desired direction by means of a movable nozzle. There can also be a separate "lift fan" to provide the vertical thrust for takeoff and landing. In the case of a highly maneuverable underwater vehicle, there may be thrusters pointed in many different fixed directions (e.g., six), since weight is not as much of a factor.

The quadcopter (also called quadrotor helicopter or simply quadrotor) has become very popular as a small drone. It has all four propulsion units pointing in the same upward direction. A quadcopter is good at hovering and small movements about hover, but not as good at forward motion.

Disadvantages of current methods include
- Exposed propellers are used, which are dangerous to people and property. Also, exposed propellers are vulnerable to damage from striking hard objects;
- Some motors do not contribute to thrust. For an airplane, total weight is important to performance and efficiency, and thus, all motors should ideally contribute to the airplane thrust;
- Fluid flow is required in awkward places. For a VTOL airplane, there must be vertical airflow, but in a compact design, this would require airflow through the fuselage, where a pilot, fuel, batteries, etc. may be located.

Conventional designs with conventional propulsion units are often not compact and do not use space efficiently due to design compromises required because of propulsion unit characteristics.

SUMMARY

One aspect of the disclosure provides a propulsion system comprising an enclosure defining three or more openings, two or more propulsion units, and a control system.

Implementations of the disclosure may include one or more of the following optional features. In some implementations the overall thrust vector is determined by a control system for the propulsion units and by a design of the shape of the enclosure. In some implementations a number of propulsion units is less than a number of openings. In some implementations the enclosure has a constant cross section, where a length of the enclosure is greater than any cross-section dimension and openings are on each end and along the length. In some implementations the enclosure includes a cylindrical duct. In some implementations the propulsion system is for use on a flying vehicle. In some implementations each propulsion unit includes a propeller mounted to a shaft of an electric motor. In some implementations there are sensors for each opening for measuring a quantity related to mass flow rate or thrust. In some implementations propulsion systems are arranged side-by-side or staggered in a horizontal plane to produce a desired force and torque about a center of mass of a vehicle.

Another aspect of the disclosure provides a propulsion device comprising a first propulsion system and a second propulsion system arranged adjacently wherein each one comprises an enclosure defining three or more openings, two or more propulsion units located inside the enclosure, and a control system which coordinates the flow rate for each propulsion unit to achieve an overall thrust magnitude and direction.

Implementations of this aspect of the disclosure may include one or more of the following optional features. In some implementations the overall thrust magnitude and direction is determined by the controlled propulsion units and a shape of the enclosure. In some implementations a number of propulsion units is less than a number of openings. In some implementations the enclosure has a constant cross section, where a length of the enclosure is greater than any cross-section dimension and openings are on each end and along the length. In some implementations the enclosure includes a cylindrical duct. In some implementations the propulsion system is for use on a flying vehicle. In some implementations each propulsion unit includes a propeller mounted to a shaft of an electric motor. In some implementations there are sensors for each opening for measuring a quantity related to mass flow rate or thrust.

The details of one or more implementations of the disclosure are set forth in the accompanying drawings and the description below. Other aspects, features, and advantages will be apparent from the description and drawings, and from the claims.

DESCRIPTIONS OF DRAWINGS

DETAILED DESCRIPTION

Differential Drive Propulsion System

A very fundamental principle from physics is that mass can neither be created nor destroyed, which is known as the conservation of mass principle.

This means that in a rigid enclosure with two or more openings, if flow rates at some openings are controlled by propulsion units, but at least one opening is uncontrolled, then the sum of the controlled flow entering the enclosure must be equal to the sum of the uncontrolled flow exiting the enclosure in the steady state. See FIG. 1-FIG. 4.

Figure 1:
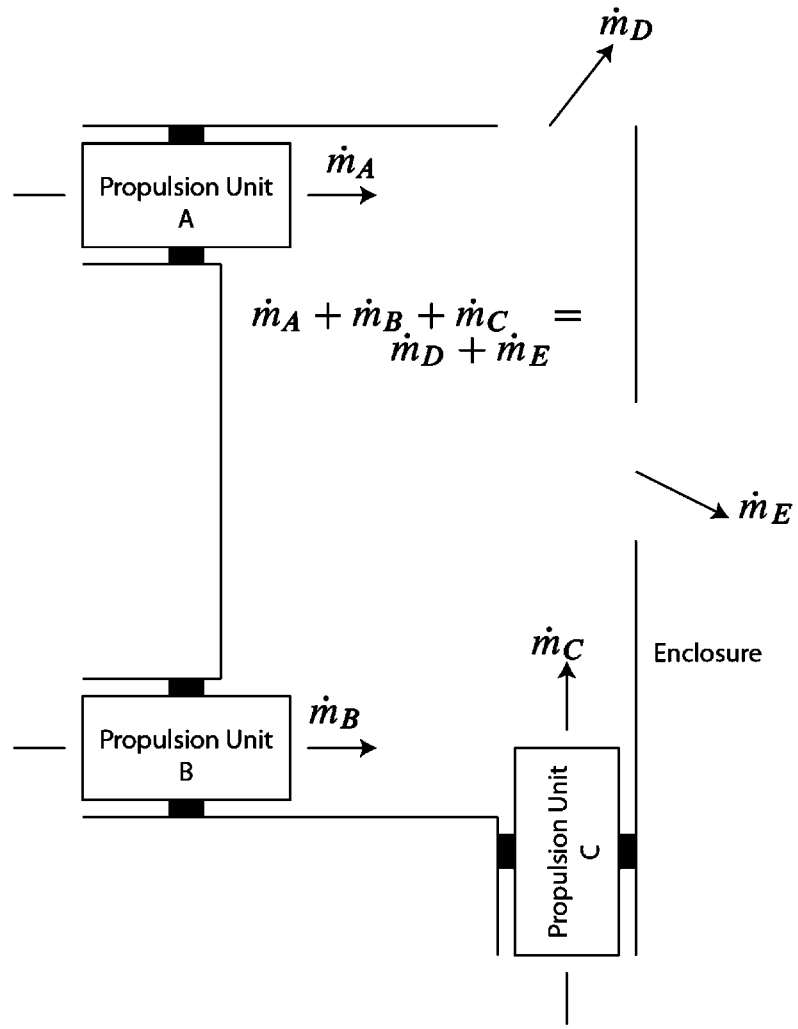
FIG. 1 shows a propulsion system including an enclosure with three propulsion units and five openings.

A propulsion system, like the one in FIG. 1, provides thrust of different amounts and in different directions by managing the flow rates at some of the openings and by proper design of the geometry. The system in FIG. 1 is a generalization of a more specific system that would be very useful for an electric VTOL airplane.

Figure 2:
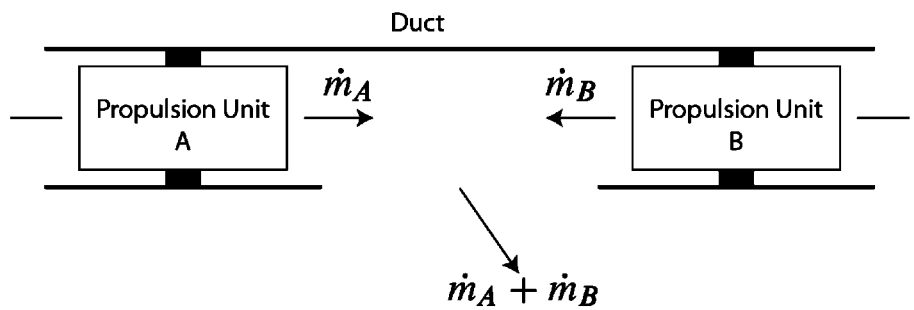
FIG. 2 shows a preferred version of a propulsion system, including a duct with two propulsion units, with openings on the left, right, and bottom.

A duct with two propulsion units and independent speed controls can be used to provide thrust in linear combinations of two orthogonal component directions. Unlike other designs, it does not inherently require moving parts, beyond those that make up the propulsive units (FIG. 2). For example, gimbaled propulsion units are an alternative design that add weight and require power that does not directly go toward thrust.

The design here has the desirable feature that all of the individual propulsion units' power can go toward vertical or horizontal thrust, which correspond to the two main modes of vertical takeoff/landing and horizontal flight for a VTOL airplane, for example. There is no wasted effort in carrying a non-contributing propulsion or actuator unit.

Another nice feature is that the propulsion units are completely enclosed inside a duct. This makes for a safer and potentially quieter system. Also, ducted fans are known to have higher efficiency than similar unshrouded propellers.

Another feature is that the top surface of the duct is solid and requires no airflow. So, the top surface is suitable for mounting underneath an airplane fuselage or ROV frame, for example.

A drawback is that there may be significant inefficiency involved in generating vertical thrust because it depends on two airflows combining and turning ninety degrees downward. However, curved duct sections, active and passive flow directors (louvers, some small motors with fans, for example), and other additions to the basic design may help to improve the efficiency. These are not covered here, but are not contrary to the main idea. However, a simple mathematical model discussed later in this document does not indicate drawbacks in combining flows.

In the following, the terms "thrust" and "mass flow rate" will often be used interchangeably. This is not strictly correct but is done to emphasize one aspect or the other (or for convenience) and because the two are related, for example, by the "thrust equation." A simple version for a propeller is $$T = \dot{m}(V_s - V_\infty) = \dot{m}\Delta V, \quad (1)$$

where T is thrust, $\dot{m}$ is mass flow rate, $V_s$ is slipstream velocity (produced by the propeller), and $V_\infty$ is the freestream velocity. This is a one dimensional equation. This document is mostly about static thrust, so the change in speed, $\Delta V$ is equivalent to the exit speed of the fluid, since there is no freestream velocity.

Further, the steady-state force exerted by a fluid on a body is given by $$\vec{F} = \int_{CS} \vec{V} \rho \vec{V} \cdot d\vec{A}. \quad (2)$$

This is a vector equation and can be one-, two-, or three-dimensional. The "CS" is for Control Surface and indicates that the integral should be taken over a closed surface surrounding the body of interest. This formula was used to generate FIG. 7 and FIG. 9.

Note that thrust is a force, with units such as Newtons, while mass flow rate is given by the formula m=ρAV, with ρ the fluid density, A the cross-sectional area, and V the fluid speed. Mass flow rate has units such as kg/s.

Figure 3:
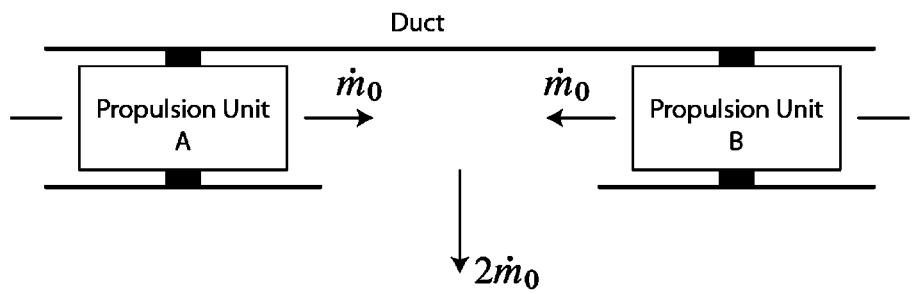
FIG. 3 shows the same duct as in FIG. 2, and only a net vertical thrust is generated.

With equal and opposite mass flow rates from the two propulsion units, The mass flow rate out of the bottom of the duct is twice the flow rate coming into each end (FIG. 3). Note that this result and some of the following results are based on the principle of "conservation of mass."

Figure 4:
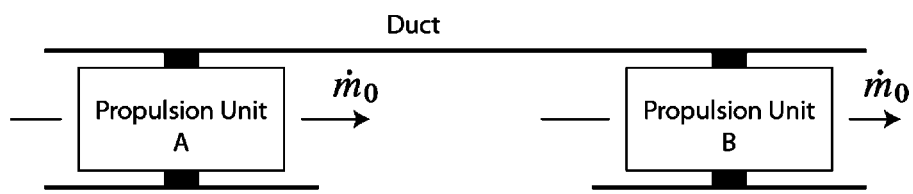
FIG. 4 shows the same duct as in FIG. 2, and only a net horizontal thrust is generated.

With equal flow rates in the same direction, the propulsive units produce horizontal thrust but no vertical thrust. The mass flow rate is the same coming out as going in (FIG. 4).

Thus, it can already be seen that this propulsive system can provide pure horizontal thrust or pure vertical thrust.

With unequal flow rate magnitudes, there is some vertical flow and some horizontal flow. This will be detailed further next.

In order to be quantitative in more general examples, it is helpful to define what amounts to a change of variables. Instead of using $\dot{m}_A$ and $\dot{m}_B$, consider instead $\dot{m}_v$ and $\dot{m}_h$, which are called vertical and horizontal flow rates, respectively. $\dot{m}_v$ is a flow rate which contributes thrust only in the vertical direction, while $\dot{m}_h$ is a flow rate which contributes thrust only in the horizontal direction. They help in understanding the propulsive system behavior, but they are not necessarily physical quantities (FIG. 5).

Figure 5A:
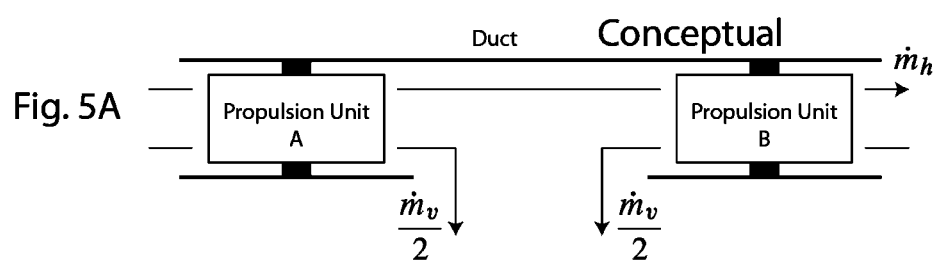
FIG. 5A shows the same duct as in FIG. 2, where the flow rates have been decomposed into a component that contributes only horizontal flow and a component that contributes only vertical flow. These flows are conceptual and don't exist physically.
Figure 5B:
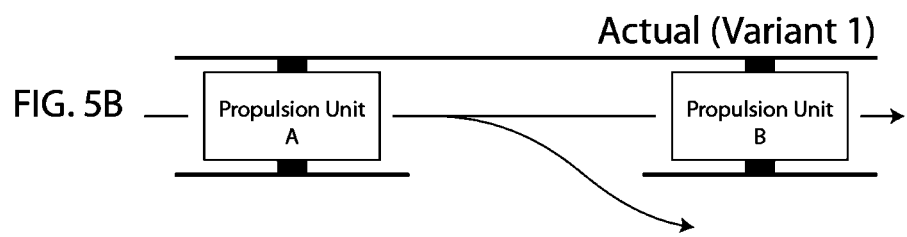
FIG. 5B shows the same duct as in FIG. 2, where there is flow out of the right opening, which is less than the flow into the left opening. As a result, there is some small flow out of the bottom, which is directed downward and to the right.

They are defined as (refer to FIG. 5 and FIG. 2)

$$\dot{m}_A = \dot{m}_h + \frac{\dot{m}_v}{2}, \quad (3)$$
$$\dot{m}_B = -\dot{m}_h + \frac{\dot{m}_v}{2}.$$

These equations can be inverted to give the vertical and horizontal flow rates in terms of the front and rear flow rates:

$$\dot{m}_v = \dot{m}_A + \dot{m}_B, \quad (4)$$
$$\dot{m}_h = \frac{\dot{m}_A - \dot{m}_B}{2}.$$

These equations make clear that by controlling the flow rates of the two propulsive units, $\dot{m}_A$ and $\dot{m}_B$, it is possible to achieve desired horizontal and vertical flow rates $\dot{m}_h$ and $\dot{m}_v$.

It is possible to check that these new equations are consistent with the previously provided intuitive special cases:

For the previous simple example of pure vertical flow rate, it is clear that $\dot{m}_A = \dot{m}_B = \dot{m}_0$ means that $\dot{m}_v = 2\dot{m}_0$ and $\dot{m}_h = 0$. Similarly, for pure horizontal thrust (flow rate), $\dot{m}_A = -\dot{m}_B = \dot{m}_0$, $\dot{m}_v = 0$, $\dot{m}_h = \dot{m}_0$.

Figure 6A:
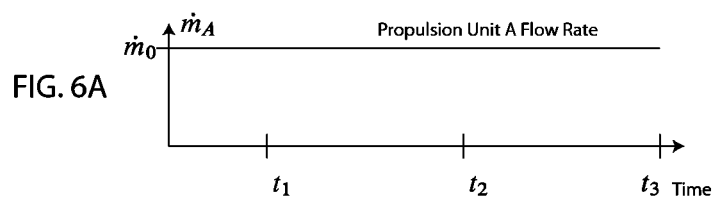
FIG. 6A shows the flow rate for propulsion unit A for a VTOL airplane mission profile, assuming the propulsion system from FIGS. 2-5C.
Figure 6B:
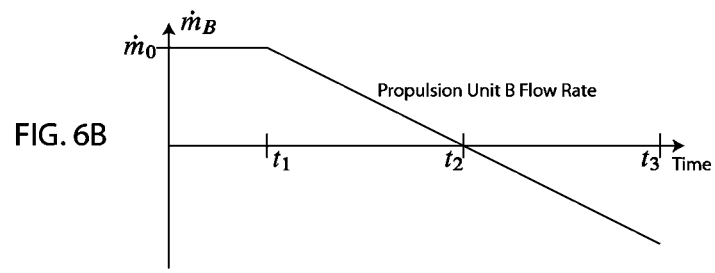
FIG. 6B shows the flow rate for propulsion unit B for a VTOL airplane mission profile, assuming the propulsion system from FIGS. 2-5C.

Consider now a more general case: For example, with a nominal $\dot{m}_A = \dot{m}_0$ and $\dot{m}_B = 0$, there is some horizontal and vertical flow: $\dot{m}_v = \dot{m}_0$, $\dot{m}_h = \dot{m}_0/2$. This is depicted in FIG. 6-FIG. 8 as the time $t_2$.

Suppose the Differential Drive Propulsive System is part of a VTOL airplane. The following is an example which shows how this disclosure applies to the special case of a VTOL mission profile.

A possible sequence of flow rates to allow a VTOL airplane to take off vertically and achieve a forward cruising speed is now possible. Fix $\dot{m}_A$ at a constant flow rate $\dot{m}_0$. But gradually vary in some manner the rear flow rate $\dot{m}_B$ from an initial $\dot{m}_0$ to a final $-\dot{m}_0$ (FIG. 6A and FIG. 6B).

Figure 6C:
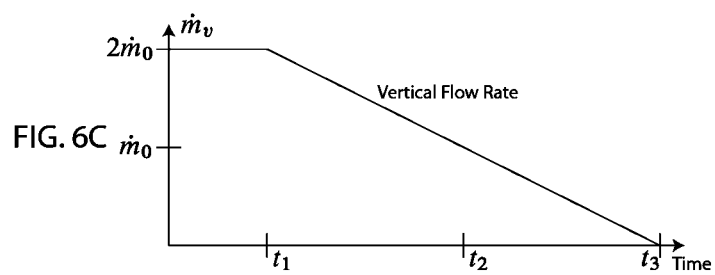
FIG. 6C shows the conceptual vertical flow (FIG. 5A) for the propulsion system from FIGS. 2-5 for a VTOL mission profile.
Figure 6D:
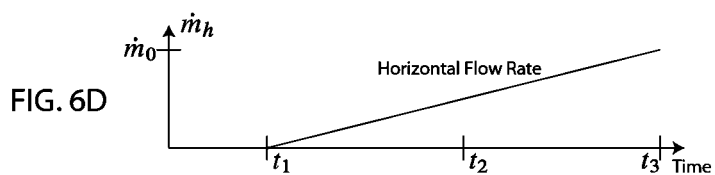
FIG. 6D shows the conceptual horizontal flow (FIG. 5A) for the propulsion system from FIGS. 2-5 for a VTOL mission profile.
Figure 7A:
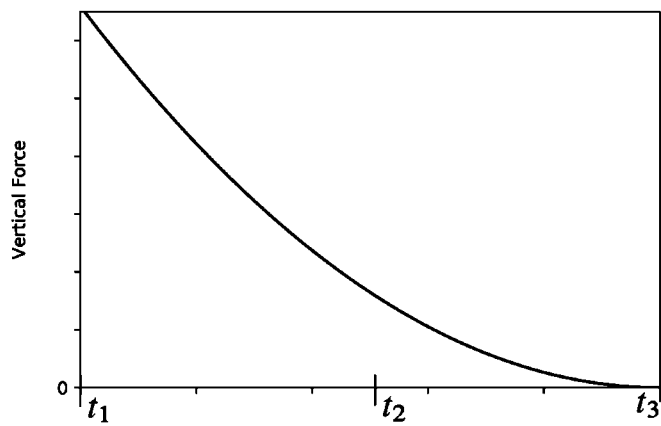
FIG. 7A shows the vertical force that is produced by the flow rates in FIGS. 6A and 6B.
Figure 7B:
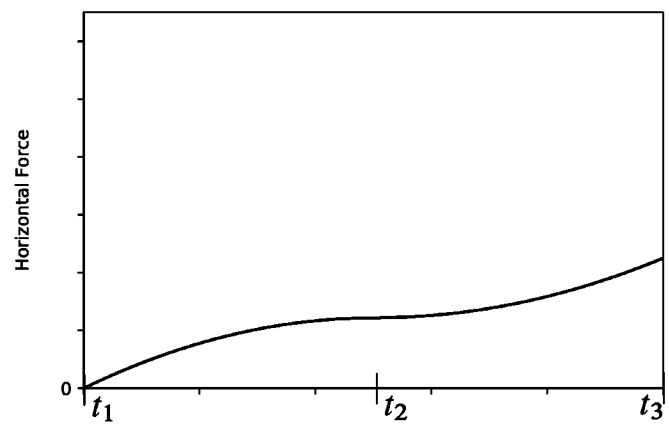
FIG. 7B shows the horizontal force that is produced by the flow rates in FIGS. 6A and 6B.

Initially, then, the propulsive system supplies all vertical thrust (flow rate) and contributes no horizontal thrust (FIG. 6C and FIG. 6D. Also, FIG. 7). After the airplane has achieved a sufficient height, the rear propulsive unit B gradually begins to slow down. This reduces the vertical thrust, but it also creates some forward thrust, and then the airplane wings can provide some lift to make up for the loss of vertical mass flow rate. The plane accelerates forward, and the rear propulsive unit B is slowed down more, which creates more forward and less vertical flow rate. Again, the wings provide lift to make up for the lost vertical thrust. This is continued until the rear propulsive unit reaches zero flow rate and then begins to generate flow in the reverse direction. When it eventually provides a flow rate of $-\dot{m}_0$, the overall flow is purely horizontal, and all lift is being provided by the airplane wings. This sequence can be executed in reverse to allow the plane to slow down and hover and then land vertically.

Although this description, along with FIG. 6 and FIG. 7, gives the basic idea and shows some benefits compared to other approaches, it is not a complete solution. First, it is likely that there wouldn't be enough vertical thrust when forward thrust was needed. Secondly, it does not address the stability required for the full six degree of freedom VTOL airplane. These suggest an arrangement of multiple differential drive propulsive systems. First, though, a better explanation of thrust from flow rates is provided.

2D Potential Flow Model

Consideration of a 2D potential flow model will provide additional evidence for the statements given above, specifically, the relationship between flow rates and forces. Potential flow is a very simple model for fluid flow and assumes inviscid, irrotational, incompressible flow. Despite these simplifications, it is a valuable starting point to understand the relationship between flow rate and force. Methods for solving potential flow problems are widely known to those skilled in the art. In some sense, a potential flow approach provides the ideal best-case performance that could be expected.

Using a 2D model means that 3D effects, such as the fluid rotation caused by a spinning fan, are being ignored. But, a 2D model is the simplest approach that allows for prediction of both horizontal and vertical forces.

FIG. 8 shows 2D potential flow for a Differential Drive Propulsion System. Also, the times $t_1$, $t_2$, $t_3$ for FIG. 8A, FIG. 8C, and FIG. 8E correspond to the same times shown in FIG. 6 and FIG. 7. In FIG. 8A, there is an equal flow rate entering the left and entering the right. Since there is a barrier at the top, all the fluid that enters must exit out the bottom. The streamlines show this. This corresponds to the situation in FIG. 3.

Figure 8A:
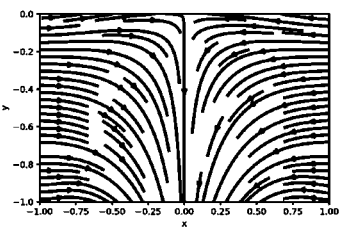
FIG. 8A shows streamlines of a simple 2D potential flow model of the propulsion system from FIGS. 2-5C at the time $t_1$ in the mission profile in FIGS. 6A and 6B.
Figure 8B:
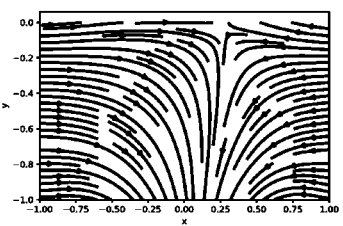
FIG. 8B shows streamlines of a simple 2D potential flow model of the propulsion system from FIGS. 2-5C at a time between $t_1$ and $t_2$ in the mission profile in FIGS. 6A and 6B.
Figure 8C:
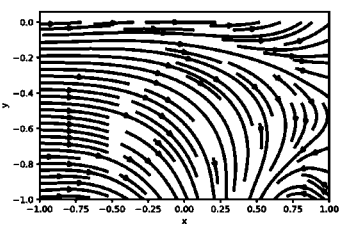
FIG. 8C shows streamlines of a simple 2D potential flow model of the propulsion system from FIGS. 2-5C at the time $t_2$ in the mission profile in FIGS. 6A and 6B.
Figure 8D:
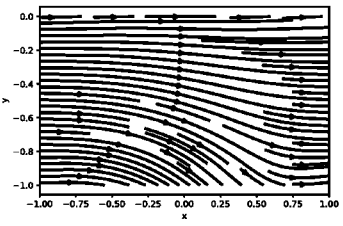
FIG. 8D shows streamlines of a simple 2D potential flow model of the propulsion system from FIGS. 2-5C at a time between $t_2$ and $t_3$ in the mission profile in FIGS. 6A and 6B.
Figure 8E:
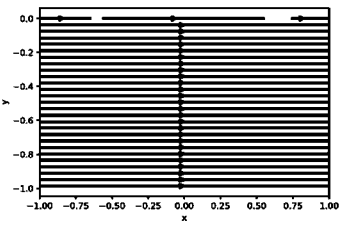
FIG. 8E shows streamlines of a simple 2D potential flow model of the propulsion system from FIGS. 2-5C at the time $t_3$ in the mission profile in FIGS. 6A and 6B.

FIG. 8E shows the case where there is an equal flow entering the left and exiting the right. The fluid simply passes straight through the duct, and the streamlines show this. This corresponds to the situation in FIG. 4.

FIG. 8C shows the case where there is flow entering the left and no net flow entering on the right.

FIG. 8B is the case where the flow entering on the right is less than the flow entering on the left. This corresponds to FIG. 5C.

FIG. 8D is the case where the flow exiting on the right is less than the flow entering on the left. This corresponds to FIG. 5B.

Also, from the 2D potential flow model, it was possible to calculate the forces produced for any situation. These forces are shown in FIG. 7 for the scenario depicted in FIG. 6. In addition, the 2D potential flow model was also used to calculate the forces shown in FIG. 9.

Figure 9A:
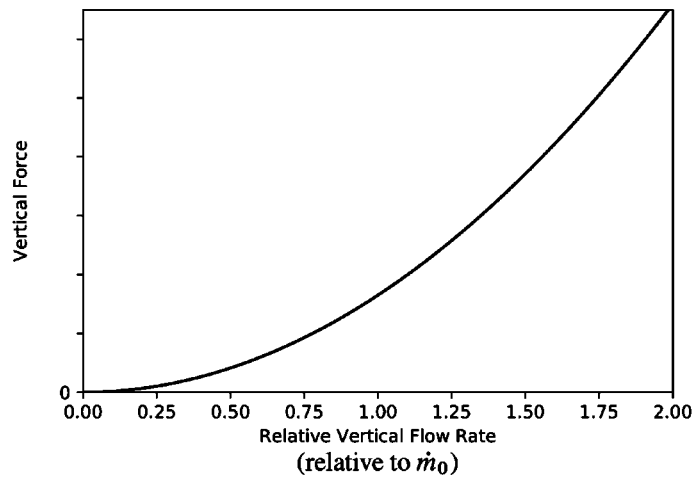
FIG. 9A depicts the explicit relationship between vertical flow rate and vertical force.

FIG. 9 shows the relationship between flow rates and forces. In FIG. 9A, the static vertical thrust is seen to be a direct function of the vertical flow rate. Increases in vertical flow rate produce increases in vertical static thrust. Conversely, it is clear that if some specific vertical thrust is desired (within some range), then there is a vertical flow rate to achieve it.

Figure 9B:
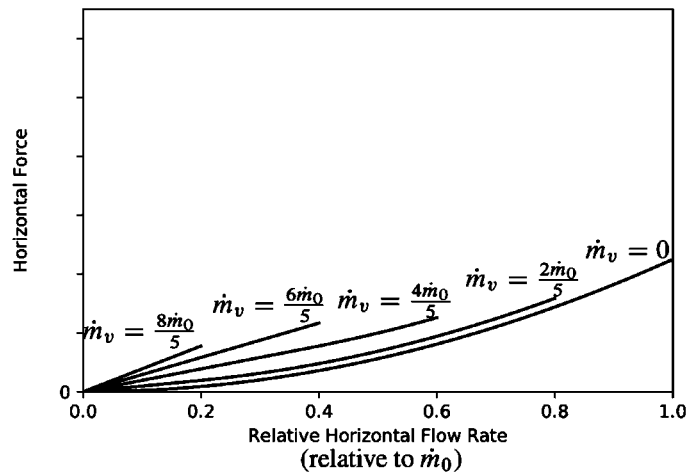
FIG. 9B depicts the explicit relationship between horizontal and vertical flow rates and horizontal force.

In FIG. 9B, the static horizontal thrust is primarily a function of the horizontal flow rate, but it is also affected by the vertical flow rate. Increasing the horizontal flow rate increases the horizontal thrust. Also, increasing the vertical flow rate also increases the horizontal thrust. Conversely, it can be seen that if some specific horizontal thrust is desired (within some range), then there is a horizontal flow rate to achieve it for any given vertical flow rate that is being used.

To summarize then, the plots of FIG. 9, which were obtained from the 2D potential flows represented in FIG. 8, show that a desired static vertical thrust can be obtained from some specific vertical flow rate. Also, given some specific vertical flow rate, then a desired horizontal thrust can be obtained from some specific horizontal flow rate. Thus, the Differential Drive Propulsion System is capable of producing any desired horizontal and vertical thrusts independently that are needed, if these desired thrusts are within specific ranges.

Figure 10A:
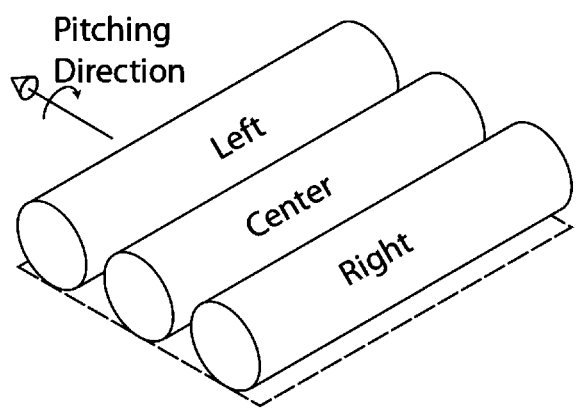
FIG. 10A shows three Differential Drive Propulsion systems (each as in FIGS. 2-5C) arranged in a particular manner in a horizontal plane to form a grouping.
Figure 10B:
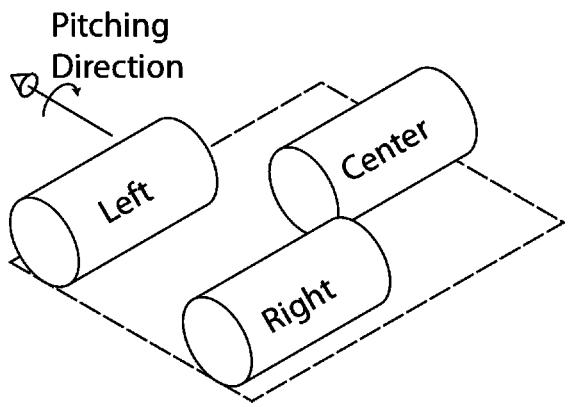
FIG. 10B shows three Differential Drive Propulsion systems (each as in FIGS. 2-5C) arranged in another particular manner in a horizontal plane to form a grouping.
Figure 11:
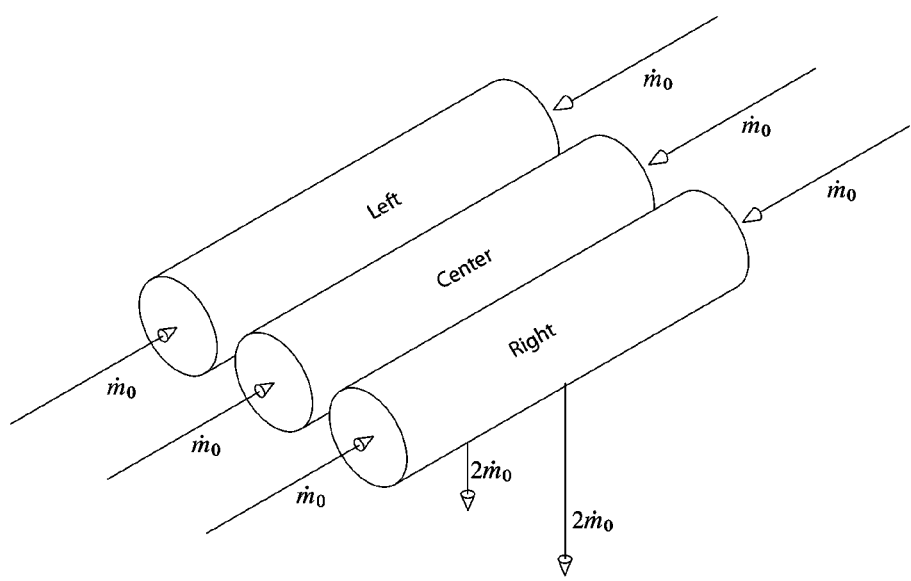
FIG. 11 shows an arrangement of three Differential Drive Propulsive Systems (each as in FIGS. 2-5C) with flow rate magnitudes and directions indicated by variable labels, arrow lengths, and directions, and only vertical thrust is generated.
Figure 12:
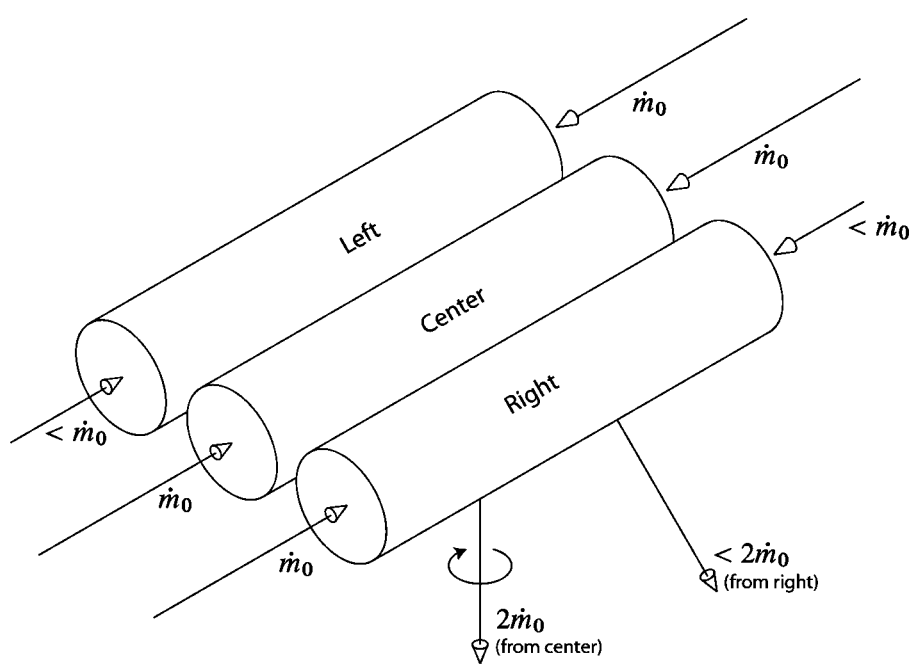
FIG. 12 shows an arrangement of three Differential Drive Propulsive Systems (each as in FIGS. 2-5C) with flow rate magnitudes and directions indicated by variable labels, arrow lengths, and directions, and thrust to produce a clockwise rotation in place.

Combining Multiple Differential Drive Propulsion Systems and Coordinated Control By using multiple differential drive propulsion systems of the type described above, an aggregate system (e.g., a propulsion device) is obtained which has more capability (FIG. 10, FIG. 11, FIG. 12). For example, in the mission profile described in FIG. 6, the center propulsion unit of FIG. 10 could provide the forward thrust, while the left and right could provide vertical thrust to help maintain the altitude until the plane was moving fast enough so that it was supported by the lift from the wings.

Pure vertical thrust with three DDPS is obtained simply by operating all three propulsive systems the same as in FIG. 3, with equal and opposite flows entering at A and B (FIG. 11).

Slow rotation in place is possible by operating the left and right propulsion systems with a slight net horizontal flow rate but mostly vertical flow. Note that the left and right propulsive systems are operated so that they produce horizontal flow in opposite directions. The center propulsion system is operated to produce only vertical thrust (FIG. 12). This maneuver would be useful to orient the airplane after it had ascended to its desired altitude and needed to point in the direction of the destination.

The aggregate system in FIG. 10 also provides the capability to stabilize the roll motion since the left and right vertical thrusts can be modulated in response to sensed roll motions. Yaw motions can also be stabilized, using the approach just described in FIG. 12.

In the following it will be shown more precisely that a vehicle with a group of three DDPS can hover. After this, it will be shown that certain motions from the hover state can also be achieved.

Figure 14:
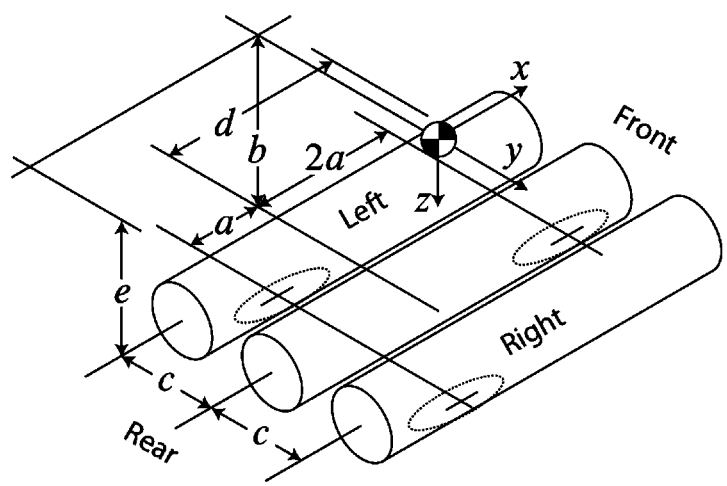
FIG. 14 shows three Differential Drive Propulsive Systems (each as in FIGS. 2-5C) with the overall center of mass, three-dimensional coordinate frame, and dimensions.
Figure 15A:
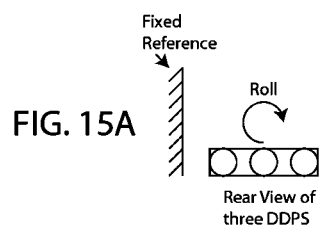
FIG. 15A shows the first part of a sequence of motions, involving a clockwise rolling motion, that can achieve a sideways translation, even without direct control over sideways motion.
Figure 15B:
FIG. 15B shows the second part of a sequence of motions, involving an upward translating motion, that can achieve a sideways translation, even without direct control over sideways motion.
Figure 15C:
FIG. 15C shows the third part of a sequence of motions, involving a counter-clockwise rolling motion, that can achieve a sideways translation, even without direct control over sideways motion.
Figure 15D:
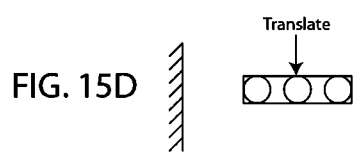
FIG. 15D shows the fourth part of a sequence of motions, involving a downward translating motion, that can achieve a sideways translation, even without direct control over sideways motion.
Figure 15E:
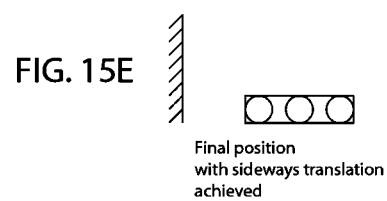
FIG. 15E shows the final configuration, after the sequence in FIGS. 15A-15D, where a sideways translation has been achieved, relative to FIG. 15A, even though direct control over sideways motion is not available.

Let the center of mass be located a distance b above the bottom of three Differential Drive Propulsion Systems (DDPS) but otherwise centered in the forward and sideways directions. (FIG. 14). Each DDPS can provide a force (thrust) in the x and z directions. The force in the x direction acts along the axis of the duct, while the force in the z direction acts at the opening on the bottom of the duct.

Figure 13:
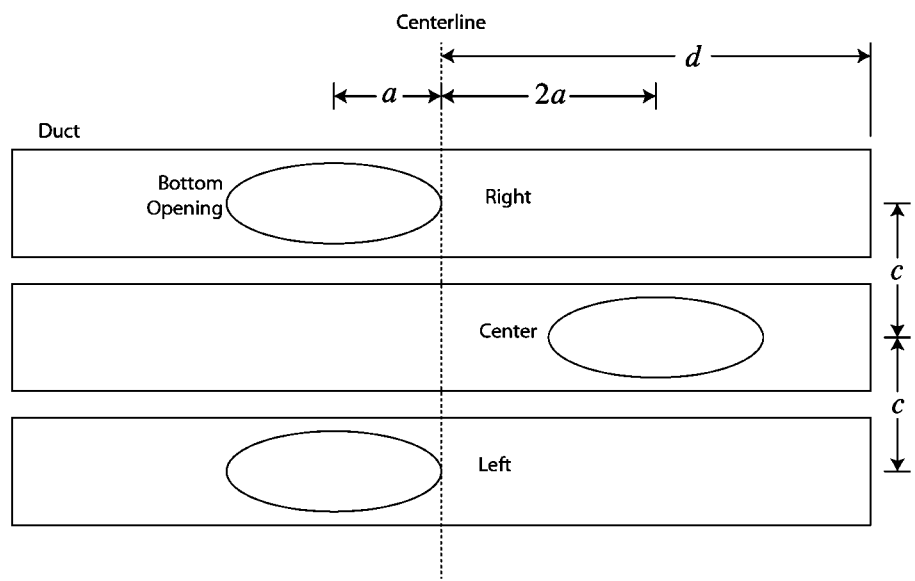
FIG. 13 shows three Differential Drive Propulsive Systems (each as in FIGS. 2-5C) with bottom openings visible and dimensions.

The system depicted in FIG. 13 and FIG. 14 can hover by generating equal vertical thrust with all three DDPS to balance the force of gravity. This is similar to FIG. 11, but FIG. 13 and FIG. 14 emphasize the placement of bottom-facing openings to produce a balanced pitching moment about the centerline (the dimension a). Notice that with equal vertical thrust from all three DDPS, a stationary state is possible because the total vertical thrust can balance the weight; there is a balance of pitching, rolling, and yawing moments; there is balance of longitudinal forces; and there is no sideways force. Thus, a hover is possible with this system.

An alternative approach to staggering the bottom-facing openings (FIG. 13, FIG. 14) is to stagger the DDPS themselves. This is depicted in FIG. 10B.

To show that small motions from this hover state are possible, additional derivations are necessary. In the following, deviations about this hover state are considered which could be used to maintain a hover in the presence of disturbances and could also produce small amplitude motions and rotations in desired, achievable directions.

A force and moment produced by a DDPS can be grouped together to form a wrench, which is a convenient concept for this analysis. A wrench takes the form $$\begin{bmatrix} \vec{f} \\ \vec{r} \times \vec{f} \end{bmatrix}, \quad (5)$$

where $\vec{f}$ is the force with 3 components, and $\vec{r}$ is the vector from the center of mass to the point where the force is applied. So, a wrench is a 6×1 vector which, in this case, gives the force on and moment about the center of mass.

Consider the left DDPS in FIG. 14, and a downward force generated by equal and opposite flows, as in FIG. 3. The force is in the z direction, i.e.

$$\vec{f} = \begin{bmatrix} 0 \\ 0 \\ 1 \end{bmatrix}. \quad (6)$$

The vector from the center of mass to the bottom opening of the left duct is $$\vec{r} = \begin{bmatrix} -a \\ -c \\ b \end{bmatrix}. \quad (7)$$

So, the associated wrench for this force and moment is $$\begin{bmatrix} 0 \\ 0 \\ 1 \\ -c \\ a \\ 0 \end{bmatrix}. \quad (8)$$

Figure 5C:
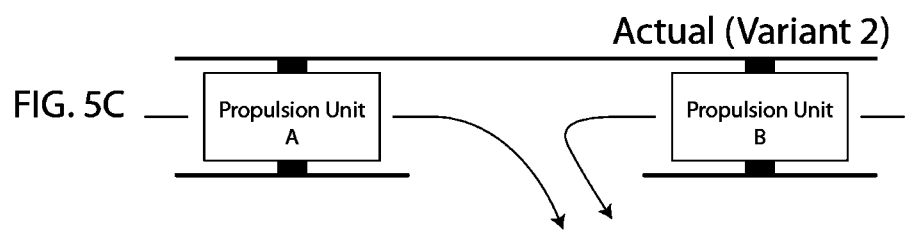
FIG. 5C shows the same duct as in FIG. 2, where there is flow into the right opening, which is less that the flow into the left opening. As a result, there is large flow out of the bottom, which is directed downward and to the right.

Again, for the left DDPS in FIG. 14, assume a forward force generated by reducing one of the flow rates, as in FIG. 12, as well as FIG. 5C. The force is in the x direction, i.e.

$$\vec{f} = \begin{bmatrix} 1 \\ 0 \\ 0 \end{bmatrix}, \quad (9)$$

while the associated vector from the center of mass is $$\vec{r} = \begin{bmatrix} d \\ -c \\ e \end{bmatrix}. \quad (10)$$

These give a wrench $$\begin{bmatrix} 1 \\ 0 \\ 0 \\ 0 \\ e \\ c \end{bmatrix}. \quad (11)$$

Continue in this manner for the other two DDPS to obtain all six wrenches with reference to FIG. 13 and FIG. 14. Then, make these the columns of a six by six matrix:

$$\overline{W} = \begin{bmatrix} 0 & 0 & 0 & 1 & 1 & 1 \\ 0 & 0 & 0 & 0 & 0 & 0 \\ 1 & 1 & 1 & 0 & 0 & 0 \\ -c & 0 & c & 0 & 0 & 0 \\ a & -2a & a & e & e & e \\ 0 & 0 & 0 & c & 0 & -c \end{bmatrix}. \quad (12)$$

The columns of this matrix capture the directions that the individual horizontal and vertical thrust forces from an individual DDPS can move the system from its equilibrium hover state. Note that the second row contains only zeros, which shows that motion sideways (y direction) is not directly possible. (Note, however, that sideways motion can be accomplished with a combination of other movements. See below.) It can be verified that this matrix $\overline{W}$ has a rank of five if and only if a≠0 and c≠0. a≠0 means that the openings on the bottoms of three ducts are offset from the centerline in the front-back (x) direction, as depicted in FIG. 13, FIG. 14, as well as FIG. 10B. c≠0 means that the ducts are offset laterally from one another in the y direction (FIG. 13, FIG. 14).

When a≠0 and c≠0, the system depicted in FIG. 14 is capable of direct motions including rotations about all three coordinate axes (roll, pitch, yaw), and it can move forward/backward and up/down.

Although the rank is not full (not six), due to not being able to directly move in the y direction, this is not as much of a drawback as it might first seem. For example, the very popular "quadrotor" design has only four directions of direct movement, which is one less. Also, the common front-steer automobile can also not directly move sideways, but it can be parallel parked (moved sideways) by combining steering and forward/backward movements.

In a similar way, combinations of directly achievable movements can be used to achieve sideways motion. The design shown here allows sideways movements in a similar way to a car. For example, a combination of counter-clockwise yaw, forward translation, clockwise yaw, and backward translation will move the three-DDPS-system sideways in a similar way as a car. Roll and vertical motions can also be combined to achieve a sideways motion (FIG. 15).

Let $\Delta f_{vl}$ be the magnitude of the extra vertical thrust from the left DDPS (beyond that necessary for maintaining hover), and let $f_{hl}$ be the horizontal thrust from the left DDPS. Similarly, define $\Delta f_{vc}$, $f_{hc}$, $\Delta f_{vr}$, and $f_{hr}$ for the center and right DDPS. Then the product of the wrenches in W with the force magnitudes gives the total forces and moments (torques) acting along and about the three coordinate axes:

$$\overline{W} \begin{bmatrix} \Delta f_{vl} \\ \Delta f_{vc} \\ \Delta f_{vr} \\ f_{hl} \\ f_{hc} \\ f_{hr} \end{bmatrix} = \begin{bmatrix} f_x \\ f_y \\ \Delta f_z \\ \tau_x \\ \tau_y \\ \tau_z \end{bmatrix}. \tag{13}$$

Again, $\Delta f$ is used instead of f to emphasize that a nominal amount of thrust is required for hovering, but here the interest is in the additional thrust beyond this hover thrust. $f_x$, $f_y$, and $\Delta f_z$ are the total forces acting on the center of mass in the x, y, and z directions (with the exception of $\Delta f_z$, which does not include the force needed to maintain hover). $\tau_x$, $\tau_y$, and $\tau_z$ are the total torques at the center of mass about the x, y, and z directions.

This equation can be inverted to provide the horizontal and vertical force components needed to achieve a given force or torque about a coordinate axis. As mentioned earlier, there is no solution when $f_y \neq 0$. For any other desired set of forces and torques, there will be a continuum of solutions, as there will be five equations and six unknowns. But the pseudo-inverse can be used to find the minimum norm solution, and minimizing the forces and torques required from the DDPS would seem like a good approach.

To simplify the analysis, define a new matrix W to be the 5×6 matrix obtained by eliminating the row of zeros in $\overline{W}$ (second row), i.e.

$$W = \begin{bmatrix} 0 & 0 & 0 & 1 & 1 & 1 \\ 1 & 1 & 1 & 0 & 0 & 0 \\ -c & 0 & c & 0 & 0 & 0 \\ a & -2a & a & e & e & e \\ 0 & 0 & 0 & c & 0 & -c \end{bmatrix}. \tag{14}$$

The pseudo-inverse of this matrix is $$W^+ = W^T(WW^T)^{-1}. \tag{15}$$

The exact expression is $$W^+ = \begin{bmatrix} -\frac{e}{6a} & \frac{1}{3} & -\frac{1}{2c} & \frac{1}{6} & 0 \\ \frac{e}{3a} & \frac{1}{3} & 0 & -\frac{1}{3a} & 0 \\ -\frac{e}{6a} & \frac{1}{3} & \frac{1}{2c} & \frac{1}{6a} & 0 \\ \frac{1}{3} & 0 & 0 & 0 & \frac{1}{2c} \\ \frac{1}{3} & 0 & 0 & 0 & 0 \\ \frac{1}{3} & 0 & 0 & 0 & -\frac{1}{2c} \end{bmatrix}. \tag{16}$$

The columns of this matrix give the solutions for the individual desired force and torque directions (and the columns' magnitudes can be scaled to increase or decrease the forces or torques). For example a forward motion would be achieved by applying a force in only the x direction. The first column gives the solution:

$$\Delta f_{vl} = -\frac{e}{6a}, \Delta f_{vc} = \frac{e}{3a}, \Delta f_{vr} = -\frac{e}{6a}, f_{hl} = \frac{1}{3}, f_{hc} = \frac{1}{3}, \tag{17}$$

$$f_{hr} = \frac{1}{3}.$$

In this case the horizontal thrusts are all ⅓ to give a total force in the x direction of 1. However, these horizontal thrusts also create undesired moments about the mass center. For this reason, there must also be vertical thrusts, $\Delta f_{vl}$, $\Delta f_{vc}$, $\Delta f_{vr}$, which serve to counteract the undesired moments.

As another example, consider a pure rolling motion. This would come from the third column of $W^+$:

$$\Delta f_{vl} = -\frac{1}{2c}, \Delta f_{vc} = 0, \Delta f_{vr} = \frac{1}{2c}, f_{hl} = 0, f_{hc} = 0, f_{hr} = 0. \tag{18}$$

In this case, the left DDPS has an upward force (beyond the force required for hover), and the right DDPS has an equal force but in the opposite direction, and these will create the roll motion.

In a similar way, the other columns of $W^+$ give the solutions for vertical motion (column 2), pitching motion (column 4), and yawing motion (column 5).

Note that the above discussion uses the terms "forward motion," "rolling motion," "pitching motion," etc. These are used somewhat informally. They are to be understood as small amplitude motions from a stationary hovering state because important dynamic terms (e.g. Coriolis, centripetal, and configuration dependent terms) in the dynamic equations are being neglected and these would affect large amplitude motions.

In conclusion, first it was demonstrated that any horizontal and vertical force (within some range) can be achieved with the Differential Drive Propulsion System concept. See FIG. 9. Next, the set of three DDPS arranged in a horizontal plane can certainly hover since it was shown that a balance of forces and moments is possible. Finally, small amplitude motions from this hover state are possible in any desired, achievable direction, including linear motion in the vertical (z) and forward (x) directions and rotation about all three axes. Explicit formulas have been provided for achieving motion in a desired direction from horizontal and vertical thrusts from each DDPS. These are just examples and serve to illustrate what can be done to maintain hover and deviate from it by some small amount. This could be extended to a more general and complete control scheme. One approach would be to derive the equations of motion of the system and then linearize them. These would consist of twelve ordinary differential equations with six inputs (the horizontal and vertical forces for each DDPS). These equations could be linearized about the hover state, and standard linear state-space control theory could be applied, such as the Linear Quadratic Regulator (LQR) approach. More advanced non-linear control theory could also be applied and might allow for larger amplitude deviations from the hover state.

A number of implementations have been described. Nevertheless, it will be understood that various modifications may be made without departing from the spirit and scope of the disclosure. Accordingly, other implementations are within the scope of the following claims.

What is claimed is:

1. A propulsion system comprising:
   an enclosure defining a single inner volume and three or more openings providing fluid flow between the single inner volume and an external volume external to the enclosure;
   two or more propulsion units located and fixed to the inside of the enclosure within the single inner volume, each one of the two or more propulsion units controlling a fluid flow into or out of one of the three or more openings;
   wherein each propulsion unit is independently controllable to provide a flow rate for the propulsion unit, the flow rates of the two or more propulsion units combine to achieve an overall thrust magnitude and direction for the propulsion system.

2. The propulsion system of claim 1, wherein a number of propulsion units is less than a number of openings.

3. A propulsion system comprising;
   an enclosure defining three or more openings;
   two or more propulsion units located and fixed to the inside of the enclosure, each one of the two or more propulsion units controlling a fluid flow into or out of one of the three or more openings;
   wherein each propulsion unit is independently controllable to provide a flow rate for the propulsion unit, the flow rates of the two or more propulsion units combine to achieve an overall thrust magnitude and direction for the propulsion system;
   the enclosure has a constant cross section, where a length of the enclosure is greater than any cross-section dimension; and
   one opening of the three or more openings is positioned on a first end or a second end of the enclosure and an additional opening of the three or more openings is positioned between the first end and the second end of the enclosure.

4. The propulsion system of claim 3 wherein the enclosure includes a cylindrical duct.

5. The propulsion system of claim 1, wherein the overall thrust magnitude and direction are determined by the controlled two or more propulsion units and a shape of the enclosure.

6. The propulsion system of claim 5 for use on a flying vehicle.

7. The propulsion system of claim 5, wherein each propulsion unit includes a propeller mounted to a shaft of an electric motor.

8. The propulsion system of claim 5, further comprising sensors for each opening, the sensors configured to measure a quantity related to mass flow rate or thrust.

9. A grouping of a plurality of propulsion systems of claim 5, the two or more propulsion units in a first propulsion system of the plurality of propulsion systems being independently controlled from each other such that flow rates through the propulsion system providing overall thrust magnitude and direction for each propulsion system to produce a force and torque about a center of mass of a vehicle to which the grouping of propulsion systems is attached.

10. The grouping of propulsion systems of claim 9, wherein the vehicle comprises a flying vehicle.

11. The grouping of propulsion systems of claim 9 wherein each propulsion unit of each propulsion system includes a propeller mounted to a shaft of an electric motor.

12. The grouping of propulsion systems of claim 9, further comprising sensors for each opening in each propulsion system, the sensors configured to measure a quantity related to mass flow rate or thrust.

13. A propulsion device comprising:
    a first propulsion system; and
    a second propulsion system arranged adjacent to the first propulsion system wherein each one of the first and second propulsion systems comprises:
    an enclosure defining three or more openings;
    two or more propulsion units located and fixed to the inside of the enclosure, each one of the two or more propulsion units controlling a fluid flow into or out of one of the three or more openings; and
    a control system configured to:
      coordinate the flow rate for each propulsion unit,
      achieve an overall thrust magnitude and direction for the propulsion system.

14. The propulsion device of claim 13, wherein the overall thrust magnitude and direction of each propulsion system is determined by the controlled propulsion units and a shape of the enclosure.

15. The propulsion device of claim 13, wherein for each propulsion system, a number of propulsion units is less than a number of openings.

16. The propulsion device of claim 13, wherein for each propulsion system:
    the enclosure has a constant cross section, where a length of the enclosure is greater than any cross-section dimension; and
    one opening of the three or more openings is positioned on a first end and a second end of the enclosure and an additional opening is positioned between the first end and the second end of the enclosure.

17. The propulsion device of claim 16, wherein the enclosure includes a cylindrical duct.

18. The propulsion device of claim 13 supported by a flying vehicle.

19. The propulsion device of claim 13, wherein each propulsion unit includes a propeller mounted to a shaft of an electric motor.

20. The propulsion system of claim 13, further comprising sensors for each opening, the sensors configured to measure a quantity related to mass flow rate or thrust.

* * * * *